United States Patent [19]

Hasegawa

[11] Patent Number: 4,848,817
[45] Date of Patent: Jul. 18, 1989

[54] HOOK FORCEPS APPARATUS FOR INDUSTRIAL ENDOSCOPES

[75] Inventor: Hiroshi Hasegawa, Hachioji, Japan

[73] Assignee: Olympus Optical Co., Ltd., Tokyo, Japan

[21] Appl. No.: 119,458

[22] Filed: Nov. 10, 1987

[30] Foreign Application Priority Data

Nov. 10, 1986 [JP] Japan ............................ 61-172239[U]
Feb. 9, 1987 [JP] Japan ............................ 62-17393[U]

[51] Int. Cl.⁴ ............................................. F01B 25/16
[52] U.S. Cl. .................................. 294/19.1; 415/118; 350/96.26
[58] Field of Search ...................... 294/19.1, 19.2, 1.1; 356/41; 73/151; 138/120, 131; 350/96.26; 415/118; 128/4, 6

[56] References Cited

U.S. PATENT DOCUMENTS 1,902,682 3/1933 Walrath .............................. 294/19.1
2,096,244 10/1937 Heinrich ............................ 294/19.1
4,298,312 11/1981 MacKenzie et al. ............. 350/96.26

FOREIGN PATENT DOCUMENTS

55-78127 6/1980 Japan .

Primary Examiner—James B. Marbert
Attorney, Agent, or Firm—Armstrong, Nikaido, Marmelstein, Kubovcik & Murray

[57] ABSTRACT

A hook forceps apparatus for industrial endoscopes in which a hook stopper is connected to the tip of an elongated flexible shaft part and is provided with a fitting part, a male screw part having a self-tapping function is formed on the outer periphery of this fitting part and, on the other hand, a recess in which the above mentioned fitting part is fitted and a female screw is cut by the male screw part is provided on the base side of a hook part to be connected to this hook stopper and which is used as inserted through a channel in the industrial endoscope.

13 Claims, 8 Drawing Sheets

HOOK FORCEPS APPARATUS FOR INDUSTRIAL ENDOSCOPES

BACKGROUND OF THE INVENTION

1. Field of the Invention

This invention relates to a hook forceps apparatus for industrial endoscopes wherein a hook part is easily connected and fixed to a forceps shaft part side without being loosened.

2. Related Art Statement

Recently, there has come to be extensively used a medical endoscope whereby a body cavity interior can be diagnosed by inserting an elongated insertable part into the body cavity. Also, in the industrial field, an industrial endoscope is extensively used in the case of inspecting the interior of an engine or such pipe as of a chemical plant.

In the case of inspecting such object to be inspected as, for example, a gas turbine engine, as seen in U.S. patent application Ser. No. 966,308 (Japanese Patent Laid Open No. 78127/1980), generally a hook forceps is used to engage the tip side of an industrial endoscope insertable part inserted into an engine with one of rotary vanes. The hook part on the tip side of such hook forceps has been heretofore brazed or soldered to the forceps shaft part. In such case, the tip part of the forceps shaft part to which the hook part is fitted has been made of stainless steel. On the other hand, the hook part brazed or soldered to this tip part has been formed also of stainless steel.

The hook made of the above mentioned stainless steel can be connected with the forceps shaft part by brazing or the like and has a mechanical strength but will catch on something in the interior and will not be able to be pulled out in the case of being pulled out of an engine after being used. In such case, the forceps shaft side can be pulled out by dropping the hook part. However, in case the hook is made of stainless steel, if it remains within a turbine, for example, of a jet engine, it will damage the interior of the turbine and will not be desirable in respect of safety.

Therefore, the hook may be formed of aluminum of a low melting point and low hardness which will melt even if dropped or will be able to bend so as to cause no trouble in the above mentioned case and a female screw part to be screwed with a screw formed at the tip of the forceps shaft part may be formed in this hook but the dimension itself of this hook is so small that the cost will become high in the step of forming the female screw, the mere screwing will loosen and therefore any other means of preventing loosening will be required.

OBJECTS AND SUMMARY OF THE INVENTION

An object of the present invention is to provide a hook forceps apparatus for industrial endoscopes wherein a hook part side is prevented from being loosened from a shaft part side without providing any other means of preventing loosening.

Another object of the present invention is to provide a hook forceps apparatus for industrial endoscopes which can be connected and fixed by being screwed in while automatically cutting a female screw while at the same time preventing loosening at the time of connecting and fixing a hook part to a shaft part side without making a female screw in the hook part at the time of making the hook part.

In the hook forceps apparatus for industrial endoscopes of the present invention, a hook stopper is connected to the tip of an elongated flexible shaft part and is provded with a fitting part, a male screw part having a self-tapping function is formed on the outer periphery of this fitting part and, on the other hand, a recess in which the above mentioned fitting part is fitted and a female screw is cut by the male screw part is provided on the base side of a hook part to be connected to the hook stopper.

In this formation, when the recess of the hook part is fitted to the fitting part of the hook stopper and the hook part is rotated while being pressed, the male screw part of the fitting part will screw in while cutting a female screw on the inside wall of the recess of the hook part and will be screwed and connected.

The other features and advantages of the present invention will become apparent enough with the following explanation.

BRIEF DESCRIPTION OF THE DRAWINGS

FIGS. 1 to 8 relate to the first embodiment of the present invention.

FIGS. 16 to 18 relate to the sixth embodiment of the present invention.

DETAILED DESCRIPTION OF THE PREFERRED EMBODIMENTS

FIGS. 1 to 8 show the first embodiment of the present invention.

Figure 1:
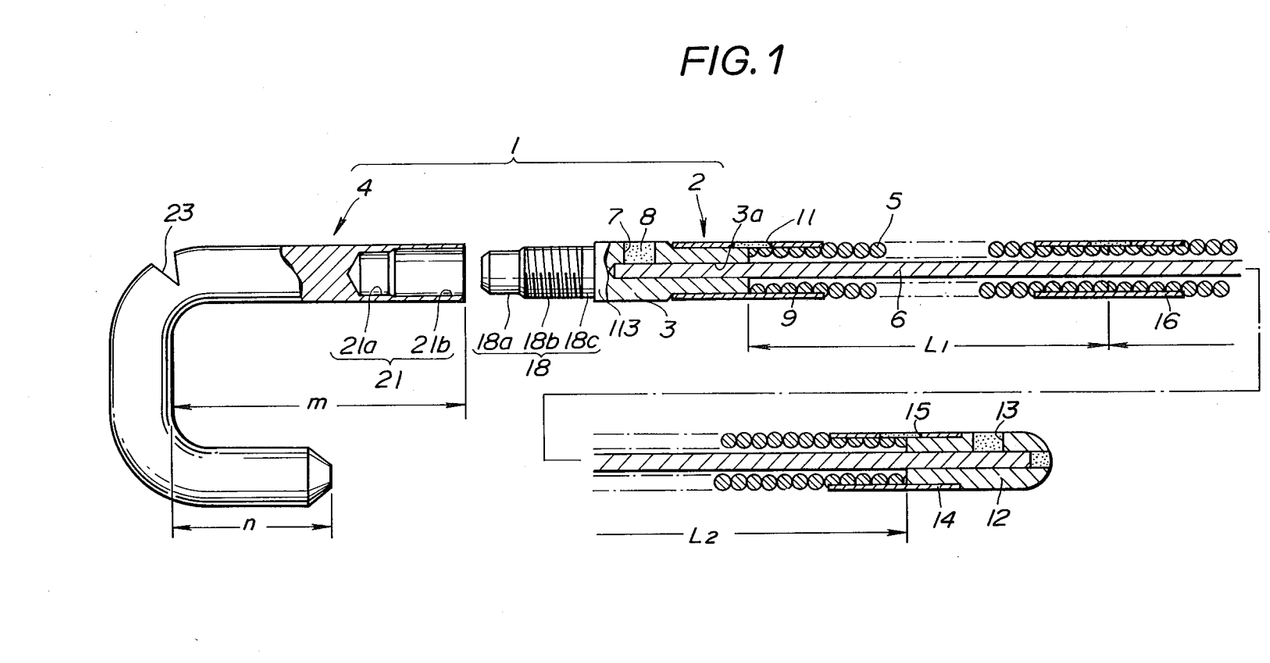
FIG. 1 is a sectioned view showing the first embodiment as disassembled.
Figure 2:
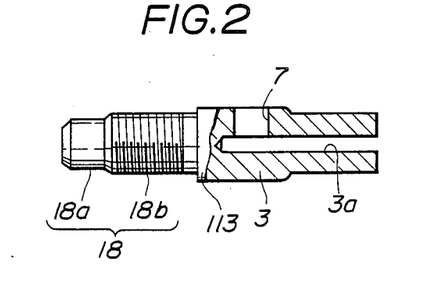
FIG. 2 is a sectioned view showing a hook stopper to be fitted to the tip of a forceps shaft part.

As shown in FIG. 1, a hook forceps 1 of the first embodiment comprises an elongated flexible forceps shaft part 2 and a hook part 4 removably fitted to a hook stopper 3 formed at the tip of this forceps shaft part 2.

In the above mentioned forceps shaft part 2, a wire 6 is inserted through the hollow of a hollow closely wound coil 5. This wire 6 is fitted at the end into a wire fixing recess 3a (See FIG. 2) formed in a substantially columnar hook stopper 3 at the tip of the forceps shaft part 2 and is secured by brazing (this brazing part is represented by the reference numeral 8) filling a lateral hole 7 (leading to this recess) formed in the hook stopper 3 of such material as, for example, stainless steel. The closely wound coil 5 is secured at the front end to the hook stopper 3 by brazing in a lateral hole 11 part formed in a pipe 9 externally fitted from the outer periphery of the rear part of the hook stopper 3 to the outer periphery of the front end part of the closely wound coil 5. By the way, in the embodiment, both of the wire 6 and closely wound coil 5 are of stainless steel in the material.

The above mentioned wire 6 is passed at the other end (rear end) through a center hole formed in a substantially columnar shaft part fixing member 12 and is brazed from the rear of this center hole and also in a lateral hole 13 part formed in the side part to be secured. Also, the closely wound coil 5 is externally fitted at the rear end with a pipe 14 on the outer peripheral surface at the rear end of the coil and the front end of the shaft part fixing member 12 and is brazed to be secured in an opening 15 part formed in the middle part.

The above mentioned closely wound coil 5 comprises a main component part L2 from the rear end side to the forward midway and a front component part L1 on the front end side. The main component part L2 is formed to be a multi-wire coil made by closely winding, for example, five wires in parallel to be high in the rigidity. On the other hand, the front component part L1 is formed to be a mono-wire coil to be high in the flexibility. The mono-wire coil is set to be positioned in the curvable part when the hook part is projected in the maximum range from the tip of the industrial endoscope. The main component part L2 of the multi-wire coil and the front component part L1 of the mono-wire coil are butted to be connected with each other. A pipe 16 is externally fitted to the outer periphery of the main component part L2 and front component part L1 of this connecting part and is fixed by brazing filling an opening of the pipe 16 formed in the outer peripheral position of the butting part.

As mentioned above, as the forceps shaft part 2 comprises the long closely wound coil 5 and the hook stopper 3 connected and fixed to the tip of this coil 5 and the closely wound coil 5 is made by butting to connect the main component part L2 of many wires and the front component part L1 of a single wire with each other, when the wire 6 is inserted and fixed at the tip in the hook stopper 3, even if any connected part is disconnected during the use, the connection will be secured by this wire 6 and the disconnected part will be able to be recovered from such inspected object as, for example, a jet engine without being dropped.

Further, the main component part L2 except the front part side of the coil 5 is made of the multi-wire coil so that, by elevating the rigidity while keeping the forceps shaft part 2 flexible, the direction of the opening part in the hook part 4 at the tip may be easily set.

A fitting part 18 used to connect the hook part 4 and to form a connecting female screw in the hook part 4 by the self-tapping function is formed on the front end side of the above mentioned hook stopper 3.

On the other hand, the hook part 4 which can be fitted to this fitting part 18 is in the form of a needle or hook made of aluminum as a material and is truncated conical at the tip. An axial recess 21 having an inside diameter in which the fitting part 18 of the hook stopper 3 can be engaged and can form a screwed female screw is formed in the base (at the rear end) of this hook part 4. This recess 21 is formed of a screwed part 21a guiding a guide part 18a of the fitting part 18 and screwed while cutting a female screw with a screw part 18b as a tap and an escape hole part 21b provided in the opening part position of the recess 21 and escaping the unscrewed part 18c including the imperfectly screwed part of the male screw part in turn from the innermost part.

Figure 3:
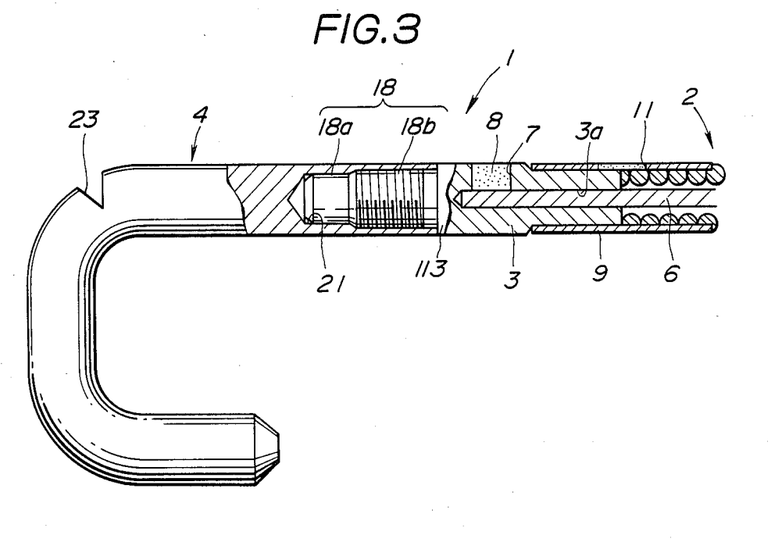
FIG. 3 is a sectioned view showing the essential part of the first embodiment with the hook part as connected.

Therefore, in order to connect and fix the hook part 4 to the hook stopper 3, the fitting part 18 of the hook stopper 3 is fitted into the recess 21 of the hook part 4. When the guide part 18a at the tip is first inserted into the screwed part which is also a guide hole part, the axial direction of the fitting part 18 and the axial direction of the recess 21 will coincide with each other and, when the hook part 4 is pushed on while being rotated, the male screw part 18b of the fitting part 18 will be screwed while cutting a female screw on the inside wall of the screwed part 21a. Thus, when the male screw part 18b of the fitting part 18 is screwed and fixed while cutting a female screw in the screwed part 21a of the recess 21 as a self-tap, the male screw part 18b will not only screw with but also bite into the screwed part 21a side so that the connected and fixed hook part 4 may not loosen. In case the above mentioned connection is by screwing of the male screw on the hook stopper 3 side and the female screw on the hook 3 side with each other, unless a separate means of preventing loosening is used, the screwing will loosen. By the way, in the embodiment, the hook stopper 3 is of stainless steel and is high in the hardness but the hook part 4 is of aluminum, is low in the hardness and is therefore easy to connect and fix by self-tapping. However, on the other hand, the female screw part cut by the self-tap on the inside wall of the screwed part 21a of the hook part made of aluminum is far weaker in the mechanical strength than the male screw part 18b of the hook stopper 3 made of stainless steel. Therefore, when the hook part 4 is butted against a step 113 of the hook stopper 3 and is to be further screwed on, the female screw part of the above mentioned hook part 4 will be broken and will no longer perform the role of a screw.

Therefore, in the embodiment, it is necessary to stop screwing the hook part 4 onto the hook stopper 3 just before the hook part 4 butts against the step 113. However, even in this case, the hook part 4 will be screwed with the hook stopper 3 by the self-tap and will not simply loosen.

An incision 23 is made near the boundary wherein the linear part on the base of the above mentioned hook part 4 is bent in the direction at right angles with it so as to form a dropping mechanism whereby, if a tractive force larger than a fixed force is applied, the tip side beyond this incision 23 will be able to be cut off to drop.

It is easy to set the dropping force at a proper value by setting the incised amount or number of the above mentioned incisions 23.

Thus, the hook part 4 is provided with the dropping mechanism to cut off and drop the tip side which is a catching side when a predetermined tractive force is applied so that, when the hook forceps 1 is inserted through an industrial endoscope into such object to be inspected as, for example, a turbine part of a jet engine, in case the hook part 4 catches on something and can not be removed, the catching side may be separated and removed from the hook forceps 1 body side and the hook forceps 1 body side and the industrial endoscope may be removed and recovered without any trouble. In case, as mentioned above, the hook part 4 catches on something and can not be removed, if the catching part is not separated and removed, the tractive force will be so strong that the industrial endoscope being used will be damaged or the forceps shaft part 2 will be likely to be cut off in the course and remain within the inspected object. On the contrary, in case the force with which the hook part 4 is to be separated and removed is not determined and the hook part 4 is separated and removed with a slight tractive force, the predetermined object as of an industrial hook forceps will not be able to be attained.

The hook part 4 which may be cut off on the above mentioned catching side is formed of aluminum. As this aluminum is low in the melting point and hardness, even if it is cut off and remains, for example, within a jet engine, it will melt or will be easily deformed to cause no trouble and, even if it collides with the interior, it will give no damage.

Figure 4:
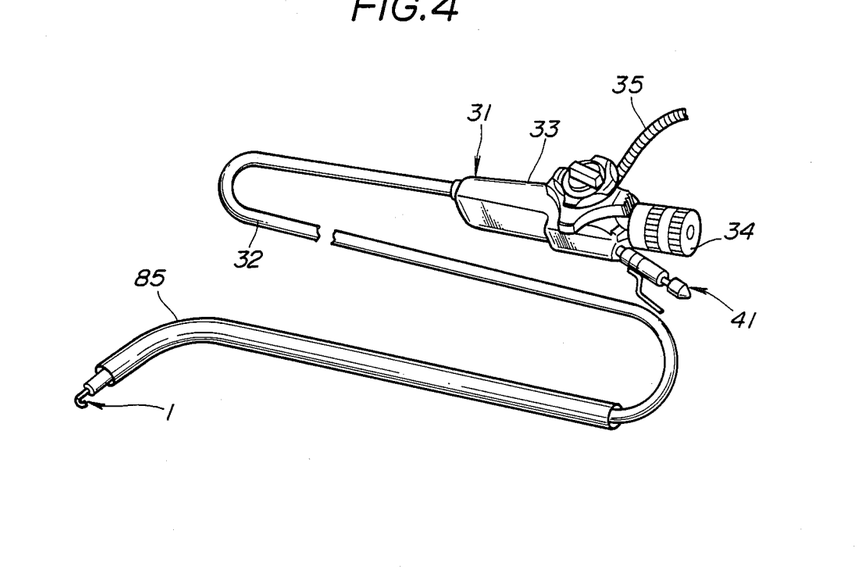
FIG. 4 is a perspective view showing an industrial endoscope.

The industrial endoscope through which the above mentioned hook forceps 1 is inserted has such structure as is shown in FIG. 4.

This industrial endoscope 31 comprises an elongated flexible insertable part 32, a large diameter or large width operating part 33 connected to the rear end side of this insertable part 32, an eyepiece part 34 provided at the rear end of this operating part 33 and a light guide cable 35 extended out of the operating part 33 side.

Figure 5:
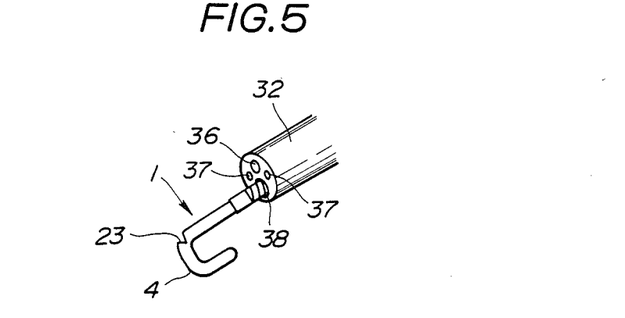
FIG. 5 is a perspective view showing the first embodiment as projected on the tip side through a channel in the industrial endoscope.

The above mentioned industrial endoscope 31 has an observing optical system 36 and illuminating optical system 37 formed in the tip part of the insertable part 32 as shown in FIG. 5 so that an illuminating light (of a light source device not illustrated) transmitted through the line guide cable 35 may be emitted from the front end by this illuminating optical system 37 and the object side to be observed with the observing optical system 36 may be illuminated.

Further, the above mentioned endoscope 31 has a hollow channel 38 through which the forceps can be inserted formed through the insertable part 32 so that normally the forceps may be inserted on the tip side through a forceps inlet port 39 side and may be projected out of an outlet port of the channel 38. Now, in the case of the hook forceps 1 which can not be inserted through the channel 38 as shown in FIG. 1, the forceps shaft part 2 on the proximal side of this hook forceps 1 can be inserted through the outlet port and then can be projected in the rear end base out of the inlet port 39 and a forceps energizing device 41 shown in FIG. 6 can be externally fitted to the projected base side to fix the hook forceps 1 as energized.

The above mentioned forceps energizing device 41 comprises a substantially cylindrical (energizing device) body 44 provided with a hollow part 43 through which the forceps 1 can be inserted, a sliding member 45 slidable with respect to this body 44, a chucking part 46 secured by screwing or the like to this sliding member 45 and fastening and fixing the forceps shaft part 2 of the hook forceps 1, a coil spring 47 energizing in the extending direction (in FIG. 6, in the rightward direction) the chucking part 46 secured to the above mentioned sliding member 45 with respect to the body 44, a connecting mechanism 48 removably fixing this device 41 to the inlet port 39 and a finger resting piece 50 secured on the base side to the above mentioned body 44 through a ring member 49.

Figure 6:
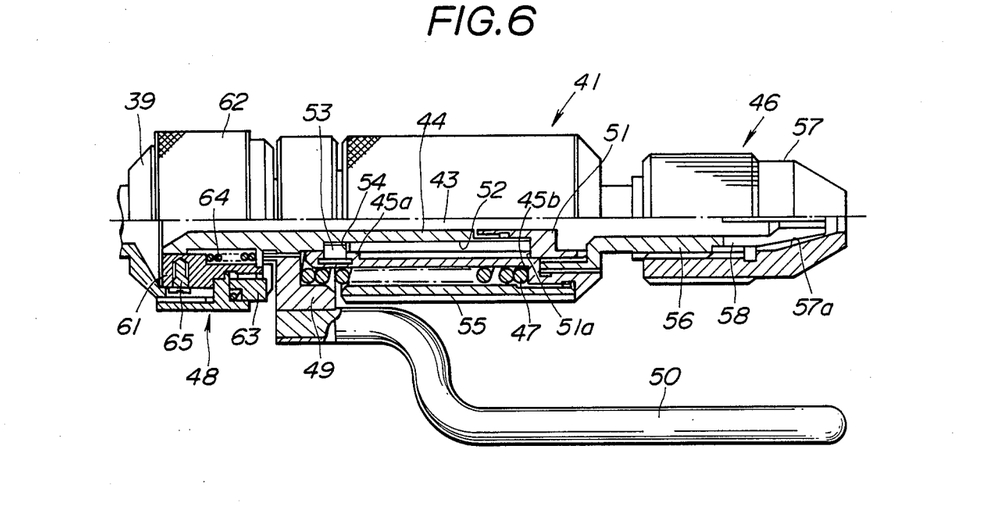
FIG. 6 is a sectioned view showing the structure of a forceps energizing device.

A regulating member 51 regulating the sliding member 45 against moving over the movable range is fixed by screwing to the rear end side of the above mentioned body 44 so that the sliding member 45 moved in the extending direction with respect to the body 44 may be regulated by the contact of a projection 45a of this sliding member 45 with a step 51a of this regulating member 51 against moving farther than this position. A longitudinal groove 52 is provided in the lengthwise direction on the outer peripheral surface of this body 44 and the front part side of the regulating member 51 secured to the rear end of this body 44. On the other hand, a pin 53 to be engaged with the above mentioned longitudinal groove 52 is provided to project inward in the radial direction in the thick part, for example, near the front end of the sliding member 45. This pin 53 is passed through a through hole of the sliding member and is then fixed by brazing on the dished part side.

A lateral groove 54 intersecting at right angles with the longitudinal groove 52 is formed in the peripheral direction in the above mentioned body 44. When the pin 53 is engaged with this lateral groove 54, the movement of the sliding member 45 by the coil spring 47 in the extending or rearward projecting direction will be regulated.

The outer peripheral surface of the sliding member 45 slidably externally fitted to the body 44 in which the above mentioned longitudinal groove 52 is formed has a cylindrical air gap part of a small diameter formed from the front end part to the vicinity of the rear end. The coil spring 47 is contained in the air gap part. This coil spring 47 contacts at the front end with the end surface of the recess of a ring member 49 and at the rear end with the step surface 45b of the sliding member 45 so as to be energized to push the sliding member 45 rearward with respect to the body 44. That is to say, the coil spring 47 is contained as contracted. In this state, as clear from FIG. 6, the sliding member 45 is slidably externally fitted to the outer periphery of the body 44 and the coil spring 47 as a means of energizing the sliding member 45 is arranged on the outer periphery of the sliding member 45 in the structure. That is to say, the sliding part and the energizing part are parallelly arranged in the lengthwise direction of the body 44 so that the total length may be made short.

By the way, the part containing the above mentioned coil spring 47 is covered outside with a cylindrical cover 55 which is screwed at the rear end on the outer periphery of the rear end part of the sliding member 45.

Now, the chucking part 46 connected to the rear end side of the above mentioned sliding member 45 comprises a chucking member 56 secured by screwing to the rear end of the sliding member 45 and a fastening member 57 screwed to the outer periphery of this chucking part body 56.

The above mentioned chucking body 56 is tapered to be smaller in the diameter toward the rear side on the outer peripheral surface of its rear end part and has several incised grooves 58 provided for a proper length in the lengthwise direction from the rear end surface to form holding pieces so that, by pressing the plurality of holding pieces provided with the incised grooves 58 from outside, these holding pieces may be made smaller in the effective inside diameter and the member passed inside these holding pieces may be pressed and held or inserted and held.

The fastening member 57 pressing the above mentioned holding pieces from the outer peripheral side is substantially cylindrical and is made smaller in the diameter on the rear end side. A tapered surface 57a becomes small in the diameter rearward is formed inside the rear end side of this fastening member 57. When this fastening member 57 is screwed and moved forward so that the screwed amount of the female screw part may become larger, the tapered surface 57a will press the holding pieces on the outer periphery and will be able to make their effective inside diameter smaller. Therefore, when the shaft part of the hook forceps 1 is passed through the hollow part 43 of the body 44 and the hollow part of the chucking part body 56 and then the fastening member 57 in the chucking part 46 is rotated to make the screwed amount larger, the shaft part will be able to be pressed and held.

On the other hand, a connecting mechanism 48 which can be removably connected to the inlet port 39 of the endoscope operating part 33 is formed in the base part (front end part) of the body 44.

That is to say, a mouthpiece part 61 to be fitted in the ring part of the inlet port 39 is fitted to the outer periphery of the front end of the body 44. The body 44 is rotatable with respect to this mouthpiece part 61. A fixing ring 62 is arranged outside this mouthpiece part 61, is fitted at the rear end to the small diameter part on the outer periphery of the rear end of the mouthpiece part 61 and is pressed in the rear part with a nut 63. The forceps fixing device 41 can be connected by screwing the screw part formed on the inner peripheral surface of this fixing ring 62 with the male screw on the outer peripheral surface of the ring part forming the inlet port 39. By the way, a coil spring 64 is contained in an air gap part provided between the body 44 and mouthpiece part 61 and the mouthpiece part 61 is energized forward by the coil spring 64 contacting at one end with the projection 44a of the body 44 and is prevented by a nut 63 having a projection contacting the above mentioned projection 44a from being pulled out.

By the way, an incised groove is formed in the ring part forming the above mentioned inlet port 39 so that a pin 65 provided to project on the mouthpiece part 61 may be engaged with this incised groove. Therefore, when the forceps energizing device 41 is connected, the fixing ring 62 and mouthpiece part 61 will be held not to be rotated. On the other hand, the body 44 side inside the mouthpiece part 61 is rotatable.

An example of inspecting such object as, for example, a turbine vane within a turbine of a jet engine by using the above mentioned first embodiment shall be explained in the following.

When the forceps shaft part 2 of the hook forceps 1 is inserted at the rear end through the outlet port of the channel 38, the hook part 4 will project out of the outlet port as shown in FIG. 5. In this case, the rear end side of the forceps shaft part 2 of the hook forceps 1 will project rearward through the forceps energizing device 41 fixed in the forceps inlet port 39.

Figure 7:
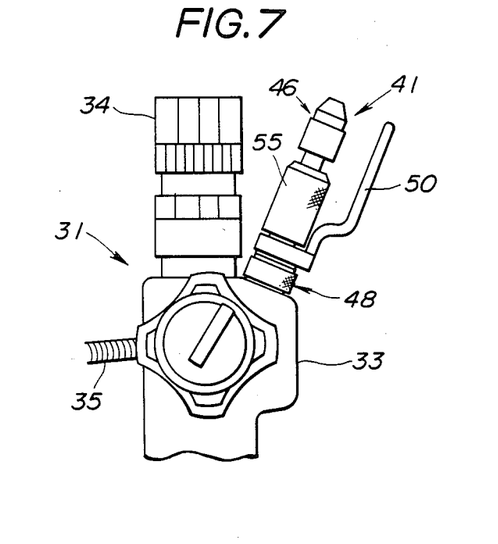
FIG. 7 is an elevation showing the forceps energizing device in FIG. 6 as fitted to the industrial endoscope.
Figure 8:
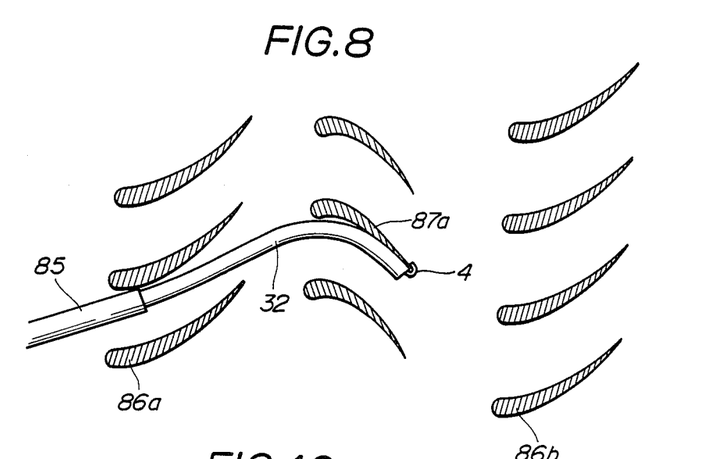
FIG. 8 is an explanatory view of the hook part of the first embodiment as caught on a turbine blade to fix the industrial endoscope.

By the way, when the pin 65 provided to project on the mouthpiece part 61 is engaged with the incised groove of the ring part of the inlet port 39 and the fixing ring 62 is rotated, the forceps energizing device 41 will be able to be screwed and connected to the ring part. In this state, as the projecting tip of the forceps energizing device 41 is to substantially the same extent as the rear end surface of the endoscope eyepiece part 34 as shown in FIG. 7, in the case of observing an object with the eye close to the rear end surface of the eyepiece part 34, there will be no trouble. This endoscope 31 is inserted through the guide tube 85 shown in FIG. 4 and the insertable part 32 of this endoscope 31 is inserted near to the turbine blades and vanes within the jet engine so as to be guided by this guide tube 85. The hook forceps 1 is projected forward, the hook part 4 is made to catch on one of the rotor side turbine blades 87a and, in this state, the endoscope insertable part 32 is pushed out forward while the hook forceps 1 is being pulled toward the operating part 33 side. In this case, the endoscope insertable part 32 will advance along the curved surface of the rotor side blade 87a as led by the hook forceps 1 and will be able to be set as shown in FIG. 8. In this state, the hook forceps 1 is fixed with the forceps shaft part 2 contracted by the forceps energizing device 41.

That is to say, the chucking part 46 side is moved toward the body 44 side against the energizing force of the coil spring 47 to press and contract the coil spring 47. When the pin 53 reaches the position of the lateral groove 54, the finger resting piece 50 will be gripped to rotate the cover member 55 so that the pin 53 may be contained within the lateral groove 54 and the coil spring 47 will be kept pressed and contracted. The fastening member 57 is rotated to be fixed as held in pressed contact with the respective holding pieces 42 formed on the rear end side of the chucking part body 56. Then, the cover member 55 is rotated in the reverse direction to contain the pin 53 within the longitudinal groove 52 so that the chucking part 46 may be pressed rearward by the pressed and contracted coil spring 47 and a tensile force may act to pull rearward the forceps shaft 2 fixed by the holding pieces. In this state, the hook part 4 of the hook forceps 1 will be held as pulled rearward in the direction reverse to the direction required to disengage the catch.

Therefore, the tip of the endoscope 31 and the hook part 4 will be pressed so as to approach each other. As the hook part 4 is in close contact with the blade 87a, the endoscope tip will be pressed against the surface of the blade 87a and the tip of the endoscope 31 will be positively fixed to the blade 87a.

Thus, with the tip of the endoscope 31 fixed to the rotor side blade 87a, by rotating the blade 87a by 180 degrees in one direction or in the reverse direction, whether the vane (in this case, on the 86b side) in front of the tip of the endoscope 31 is damaged or not can be inspected.

By the way, in the above mentioned forceps energizing device 41, as a rotating mechanism is formed in the connecting mechanism 48 part, the direction of the hook part 4 of the hook forceps 1 can be directed in any desired direction. In this case, as the fixing ring 62 to be a connecting means by screwing is not rotated, such defect as the loosening of the screwing will not occur.

After the above mentioned inspection, the fixing by the forceps energizing device 41 is released, the endoscope insertable part 32 is pulled out and the hook part 4 of the hook forceps 1 is removed from the blade and is pulled out. In pulling out the hook part 4 rearward, in case it catches on the blade or the like on the way and is hard to pull out, if it is pulled with a set force large to some extent, the hook part 4 in front of the incision 23 will be able to be dropped. When this hook part 4 is dropped, there will be no catching part in pulling out the forceps shaft part 2 and therefore it will be able to be easily pulled out of the engine.

In this first embodiment, the hook part 4 is provided with the incision 23 from which the hook part 4 can be dropped with a predetermined tractive force, can be prevented from being dropped when it is used with a force smaller than a predetermined force and can be simply dropped by applying a tractive force larger than is predetermined in case it is difficult to pull out after the use.

Figure 9:
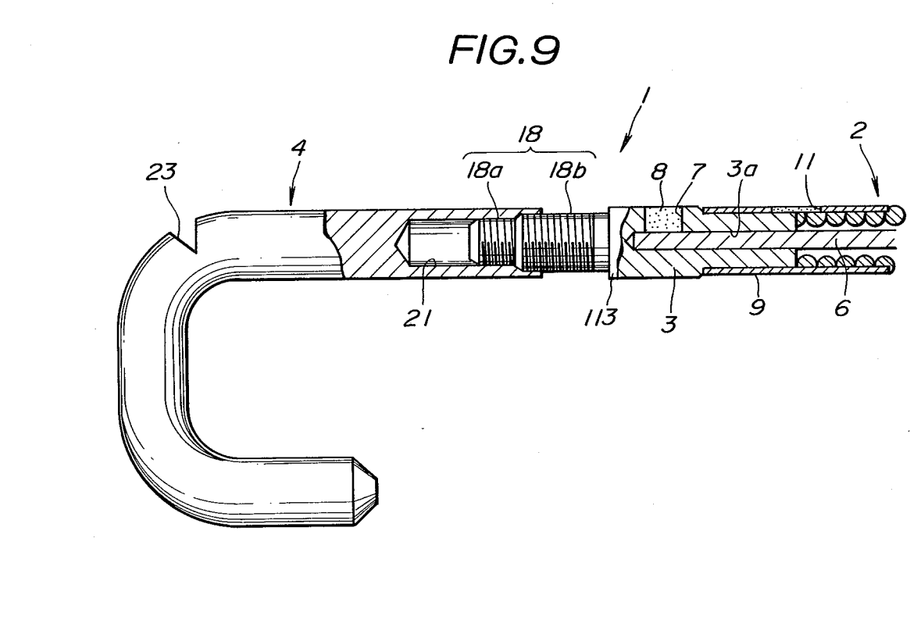
FIG. 9 is a sectioned view showing the second embodiment of the present invention.

FIG. 9 shows an elevation of the second embodiment of the present invention as sectioned in the essential part. In this embodiment, the guide part 18a of the fitting part 18 provided on the hook stopper 3 is used also for a male screw part and has a self-tapping function added to this position.

Figure 10:
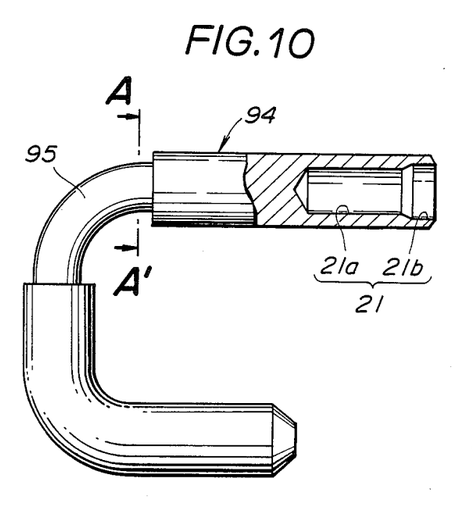
FIG. 10 is a sectioned view showing a hook part in the third embodiment of the present invention.
Figure 11:
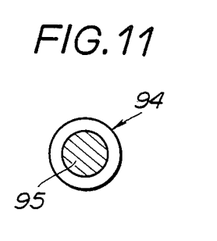
FIG. 11 is a sectioned view on line A—A' in FIG. 10.

FIG. 10 shows a hook part 94 in the third embodiment of the present invention. This hook part 94 is provided with a step-like small diameter part 95 for a proper length in the curved part instead of the incision 23 in FIG. 1. In this embodiment, when a predetermined tractive force is applied, the small diameter part 95 of the curved part will stretch to release catching. In some case, this small diameter part 95 can be cut off to cut off the catching part. By the way, in this case, the small diameter part 95 may be provided with an incision or groove. FIG. 11 shows a cross-section of the small diameter part 95 on line A—A' in FIG. 10.

Figure 12:
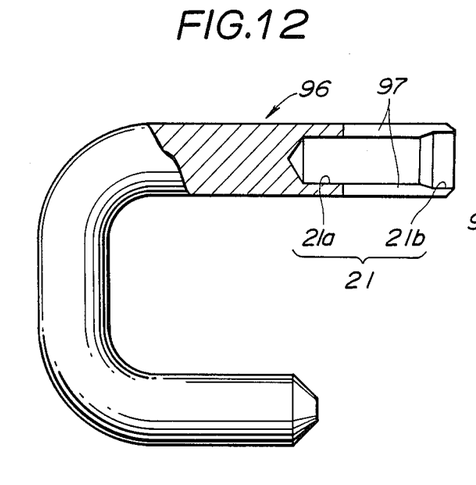
FIG. 12 is a sectioned view showing a hook part in the fourth embodiment of the present invention.

FIG. 12 shows a hook part 96 in the fourth embodiment of the present invention.

Figure 13:
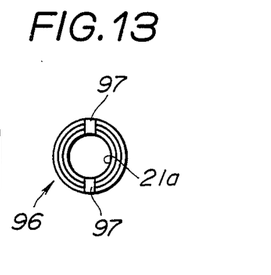
FIG. 13 is a back view of FIG. 12.
Figure 14:
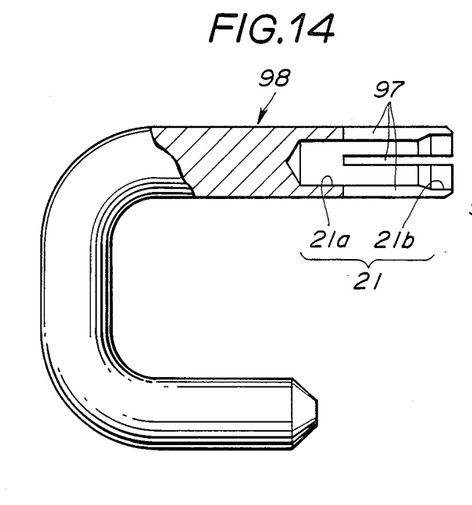
FIG. 14 is a sectioned view showing a hook part in the fifth embodiment of the present invention.
Figure 15:
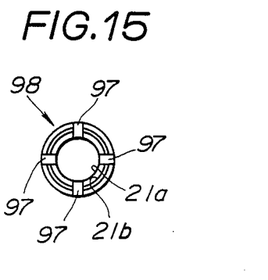
FIG. 15 is a back view of FIG. 14.

In this embodiment, the hook part 96 is fitted and connected to the hook stopper 3 by the self-tapping function of a male screw provided on the fitting part of the hook stopper 3 the same as in the first embodiment and slit grooves 97 in the axial direction communicating with the recess 21 are provided as opposed to each other. In this embodiment, the hook part 96 is screwed on the fitting part of the hook stopper 3 by the self-tap but will be elastically deformed by the pair of slit grooves 97 when screwed and the female screw formed in the recess 21 will be shallow. Therefore, when a tractive force larger than is predetermined is applied, the part between the slit grooves 97 will be deformed and expanded, the cut and bitten female screw will be shallow and therefore the entire hook part 96 will be able to be removed from the hook stopper 3 which is on the body side. The above mentioned removing force can be freely set by adjusting the length and width of the slit groove. In this embodiment, the slit grooves 97 are in two places as shown in FIG. 13. However, as in the fifth embodiment shown in FIGS. 14 and 15, the slit grooves 97 may be provided in four places in the hook part 98.

Figures 16, 17, 18:
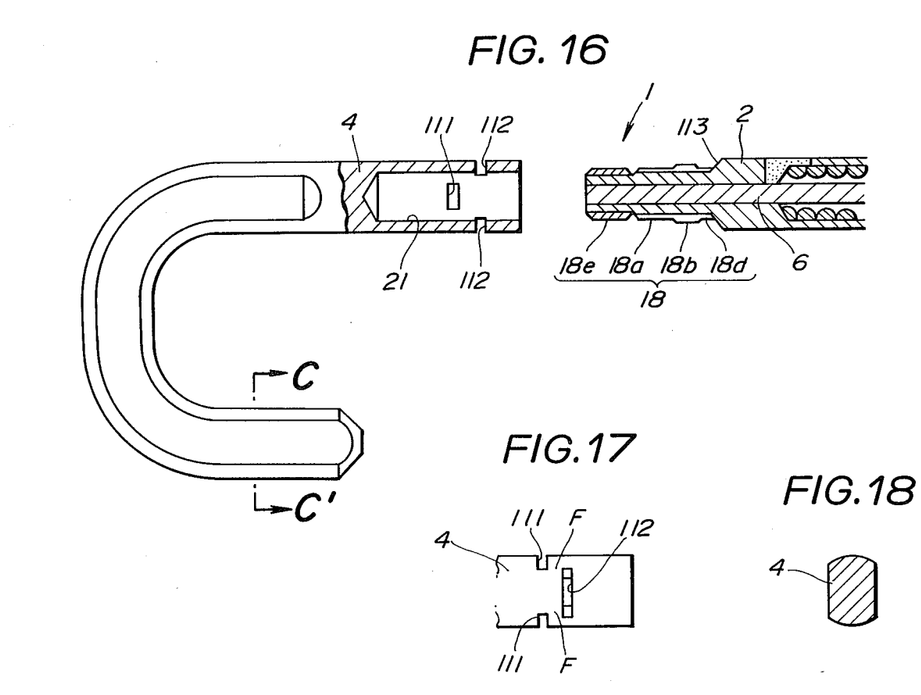
FIG. 16 is a sectioned view.
FIG. 17 is an elevation view of the base side of a hook part.
FIG. 18 is a sectioned view on line C—C' in FIG. 16.

FIGS. 16 to 18 are of the sixth embodiment of the present invention.

In this embodiment, the tip side of the guide part 18a of the fitting part 18 proviedd on the hook stopper 3 is cut to be smaller in the diameter, a guide pipe 18e of the same diameter as of the guide part 18a is fitted and, on the other hand, slits 111 opposed to each other in the direction (peripheral direction) intersecting at right angles with the axial direction and communicating with the recess 21 and the same slits 112 in the positions diaplaced by a small spacing, for example, by 90 degrees from these slits 111 are formed on the outer periphery on the base side of the hook shaft 4.

Also, in this embodiment, as the outside diameter of the unscrewed part 18d of the fitting part 18 is formed to be equal to or rather smaller than the outside diameter of the guide part 18a, the escape hole part 21b provided in the opening in the first embodiment is omitted. By the way, it is the same as in the first embodiment that the male screw part 18b provided in the rear of the guide part 18e has a tapping function so that the hook part 4 may be screwed and fixed while cutting a female screw on the inside wall of the recess 21 of the hook part 4 by this male screw part 18b.

In this formation, in case the hook part 4 catches on the inspected object and can not be removed, when the hook part 4 is pulled with a predetermined tractive force, as shown in FIG. 17, it will be broken in the position of the connecting part F between the pair of slits 11 and the other pair of slits 12, the catching side of the hook part 4 will be cut off and the hook stopper 3 side (including the base side of the hook part 4) will be able to be removed from the hook part 4. At this time, as the guide pipe 18e smooth on the surface is fitted to the tip on the hook stopper 3 side, the tip side will not bite into the inside wall of the recess 21 and will not obstruct the cutting off. Therefore, it is desirable that this guide pipe 18c is small in the friction coefficient and is of such material low in the melting point and hardness as, for example, aluminum in consideration of dropping into the inspected object. Also, the spacing of the above mentioned F position is so set that the hook part 4 may not be broken by the screwing torque produced when the hook part 4 is screwed on the hook stopper 3 and that the removing force for the hook part 4 may be of a proper value.

Further, in this embodiment, in consideration of the likelihood of the fitting part 18 provided on the tip side of the hook stopper 3 being cut off when the above mentioned hook part side is cut off, the wire 6 is extended and fixed to the tip of the fitting part 18 so that the fitting part 18 may not drop even in such case.

In this invention, it is apparent that working modes different in a wide range can be formed without deviating from the spirit and scope of the invention. This invention is not restricted by its specific working modes except being limited by the appended claims.

What is claimed is:

1. A hook forceps apparatus for industrial endoscopes comprising:
    an elongated flexible forceps shaft part;
    a hook stopper connected to the tip of said shaft part;
    a fitting part provided on said hook stopper and having a male part with self-tapping screw threads formed on the outer periphery; and
    a hook part of a material softer than the material of said self-tapping threads of said fitting part for connection to said hook stopper and having on the base side a recess in which said self-tapping screw threaded male part of said fitting part is fitted and for receiving female screw cut by said male screw part fitted therein.

2. A hook forceps apparatus for industrial endoscopes according to claim 1 wherein said forceps shaft part comprises a hollow closely wound coil and a wire inserted through the hollow of said coil.

3. A hook forceps apparatus for industrial endoscopes according to claim 2 wherein said closely wound coil comprises a main component part from the rear end side to the forward midway and a front component part on the front side, said main component part is formed of a multi-wire coil made by parallelly closely winding a plurality of wires to elevate the rigidity and said front component part is formed to be a mono-wire coil to elevate the flexibility.

4. A hook forceps apparatus for industrial endoscopes acording to claim 3 wherein said front component part is set to be positioned in a curvable part when the hook part is projected in a maximum range from the tip of the endoscope.

5. A hook forceps apparatus for industrial endoscopes according to claim 3 wherein said main component part and front component part of said coil are butted to be connected with each other, a pipe is externally fitted on the outer periphery of said main component part and front component part in the connecting part and a hole in the pipe formed in the outer peripheral position of the butting part is filled with a bonding agent to fix the pipe.

6. A hook forceps apparatus for industrial endoscopes according to claim 1 wherein said fitting part comprises a guide part of a small diameter in the front step and a male screw part having a self-tapping function in the rear step.

7. A hook forceps apparatus for industrial endoscopes according to claim 6 wherein the guide part in the front step of the fitting part is provided also with a male screw part having a self-tapping function.

8. A hook forceps apparatus for industrial endoscopes according to claim 1 wherein said recess of the hook part comprises a screwed part guiding the guide part of the fitting part and screwed while cutting a female screw with the male part as a tap and an escaping part provided in the opening position of the recess and escaping the unscrewed part including the imperfectly screwed part of the male screw part in turn from the innermost part.

9. A hook forceps apparatus for industrial endoscopes comprising:

an elongated flexible forceps shaft part;

a hook stopper connected to the tip of said shaft part;

a fitting part provided on said hook stopper and having a male screw part having a self-tapping function formed on the outer periphery;

a hook part connected to said hook stopper and having on the base side a recess in which said fitting part is fitted and a female screw is cut by said male screw part; and a dropping mechanism formed in said hook part to drop the tip side when a tractive force larger than is fixed is applied.

10. A hook forceps apparatus for industrial endoscopes according to claim 9 wherein said dropping mechanism is an incision formed in the midway to cut off and drop the tip side.

11. A hook forceps apparatus for industrial endoscopes according to claim 9 wherein said dropping mechanism is a step-like small diameter part formed in the midway to cut off and drop the tip side.

12. A hook forceps apparatus for industrial endoscopes according to claim 9 wherein said dropping mechanism consists of slit grooves in the axial direction formed as opposed to each other on the outer periphery of the hook part and communicating with said recess so that said slit grooves will be deformed to drop the hook part when a tractive force larger than is fixed is applied.

13. A hook forceps apparatus for industrial endoscopes according to claim 9 wherein said dropping mechanism is of a formation wherein the tip side of the guide part of said fitting part provided on the hook stopper of said shaft part is made small in the diameter and is fitted with a guide pipe of the same diameter as of said guide part and, on the other hand, slits opposed to each other in the direction intersecting at right angles with the axial direction and communicating with said recess and the same slits in predetermined angular positions at a small spacing from said slits are formed on the outer periphery on the base side of said hook part.

* * * * *